US006754789B2

(12) United States Patent
Skendzic et al.

(10) Patent No.: US 6,754,789 B2
(45) Date of Patent: Jun. 22, 2004

(54) DISTRIBUTED FAULT RESILIENT SHARED MEMORY

(75) Inventors: Veselin Skendzic, Racine, WI (US); Eric Arden Lee, Anchorage, AK (US); Timothy Robert Day, Racine, WI (US)

(73) Assignee: McGraw-Edison Company, Houston, TX (US)

( * ) Notice: Subject to any disclaimer, the term of this patent is extended or adjusted under 35 U.S.C. 154(b) by 211 days.

(21) Appl. No.: 10/079,493

(22) Filed: Feb. 22, 2002

(65) Prior Publication Data

US 2003/0163653 A1 Aug. 28, 2003

(51) Int. Cl.[7] .......................... G06F 12/00; G06F 13/00
(52) U.S. Cl. ........................ 711/153; 711/147; 709/215
(58) Field of Search ............................... 711/147, 153; 709/213, 214, 215

(56) References Cited

U.S. PATENT DOCUMENTS

| | | | | |
|---|---|---|---|---|
| 4,495,493 | A | | 1/1985 | Segarra et al. ........... 340/825.5 |
| 4,926,375 | A | | 5/1990 | Mercer et al. .............. 709/201 |
| 5,202,970 | A | | 4/1993 | Schiffleger .................. 711/151 |
| 5,761,413 | A | * | 6/1998 | Frank et al. ................... 714/49 |
| 5,761,729 | A | * | 6/1998 | Scales ......................... 711/148 |
| 5,793,750 | A | | 8/1998 | Schweitzer, III et al. ... 370/242 |
| 5,893,161 | A | | 4/1999 | McGuffey et al. .......... 711/152 |
| 6,085,295 | A | | 7/2000 | Ekanadham et al. ........ 711/145 |
| 6,360,303 | B1 | | 3/2002 | Wisler et al. ................ 711/153 |
| 2002/0029800 | A1 | * | 3/2002 | West ........................... 137/100 |

OTHER PUBLICATIONS

H.E. Bal, Programming Languages for Distributed Computing Systems, ACM Computing Surveys, vol. 21, No.3, Sep. 1989.

* cited by examiner

*Primary Examiner*—Glenn Gossage
(74) *Attorney, Agent, or Firm*—Fish & Richardson P.C.

(57) ABSTRACT

Memory sharing techniques include providing a first device and one or more additional devices. Each device has a memory and is configured to be connected to a network. A portion of the first device memory is allocated, and may be divided into two or more first device memory segments. Each first device memory segment corresponds to a device, and at least one of the first device memory segments corresponds to an additional device. A portion of the additional device memory is allocated, and may be divided into two or more additional device memory segments. Each additional device memory segment corresponds to a device, and at least one additional device memory segment corresponds to the first device. A first device data segment is provided to the additional device, and a first device data validity indication is derived at the additional device. The first device data validity indication is associated with the first device data segment, and the additional device memory segment corresponding to the first device is updated based on the association.

20 Claims, 9 Drawing Sheets

| Field Name | Example Data (Hex) | |
|---|---|---|
| Slave Address | 00x | ~515 |
| Function Code | 10x | ~520 |
| Starting Address High | 00x | ~525 |
| Starting Address Low | 04x | ~530 |
| Number of Registers High | 00x | ~535 |
| Number of Registers Low | 03x | ~540 |
| Byte Count | 06x | ~545 |
| Data p High | ... | ~550 |
| Data p Low | ... | ~555 |
| Data q High | ... | ~560 |
| Data q Low | ... | ~565 |
| Data r High | ... | ~570 |
| Data r Low | ... | ~575 |
| Error Check | CRC | ~580 |

505 — Field Name column; 510 — Example Data (Hex) column

DISTRIBUTED FAULT RESILIENT SHARED MEMORY

BACKGROUND

Shared memory applications often involve a single physical memory used by multiple devices such as, for example, microprocessors. Specialized hardware is typically needed to resolve issues such as, for example, access conflicts when two or more devices attempt to store data simultaneously. Such an approach may be expensive when sharing data among physically dispersed monitoring and control nodes connected over a low speed communications network.

SUMMARY

The following description relates to shared memory, and in particular to information sharing among nodes of a communications network.

Memory space may be shared in a robust manner among multiple devices connected to a communications network by maintaining shared information in a number of individual network nodes. Each participating device is connected to the communications network and has a memory configured to store data provided by participating devices. Arbitrary amounts of memory may be shared. Also, the data shared may include any type of data such as, for example, floating point numbers, signed and unsigned integers of any length, characters, bytes, bits, collections of bits, and data structures.

Techniques are used to provide for data arbitration issues. For example, the memory may have a number of segments pre-allocated to store information provided by participating devices connected to the communications network. Each device is responsible for updating its allocated memory block on other devices. Only one device may be permitted to update a given memory segment, but the memory segment is visible to other participating devices and may be read and used by the other devices.

A broadcast mechanism such as, for example, a Modbus-based broadcast command, may be used to publish the contents of a device's allocated memory block to other devices. Techniques are used for resolving network collisions, arbitrating network access rights, and recovering from faults such as, for example, a communications link failure or a device failure. For example, a round robin scheme may be employed using a memory-address-based bus ownership mechanism and a timeout mechanism. Also, where the physical layer of the communications network is capable of detecting and arbitrating network access collisions, each device may attempt to transmit its data segment as soon as it becomes available.

Techniques are used for detecting and reporting communications errors. For example, an indication of data validity may be provided and associated with the data provided by a participating device, which allows for detecting and reporting errors. Also, the detection and reporting of errors at a device permits that device to make decisions based upon the best available set of valid data.

Such a system may be used in many contexts such as, for example, in the control, supervision and protection of a power system network or in the control and supervision of an industrial process.

In one general aspect, memory sharing includes providing a first device and one or more additional devices. Each device has a memory and is configured to be connected to a network. A portion of the first device memory is allocated, and may be divided into two or more first device memory segments. Each first device memory segment corresponds to a device, and at least one of the first device memory segments corresponds to an additional device. A portion of the additional device memory is allocated, and may be divided into two or more additional device memory segments. Each additional device memory segment corresponds to a device, and at least one additional device memory segment corresponds to the first device. A first device data segment is provided to the additional device, and a first device data validity indication is derived at the additional device. The first device data validity indication is associated with the first device data segment, and the additional device memory segment corresponding to the first device is updated based on the association.

Implementations may include one or more of the following features. For example, a decision may be made by the additional device based at least in part upon the updated additional device memory segment corresponding to the first device. The decision may be used, for example, at least in part to supervise, control, or protect a power system, or to supervise and control an industrial process.

In another implementation, the first device data segment may be provided periodically to the additional devices. The size of the memory portion allocated for each device may be equal to or different from the size of the memory allocated for every other device. Also, the size of the memory segment for one device may be equal to or different from the size of the memory segment of another device.

In another implementation, the network may include a serial data link with the devices physically dispersed from one another. The first device data segment may be provided using the Modbus protocol, and the first device may provide an error checking mechanism to the additional device. Also, the first device validity indication may be derived by the additional device based upon reception of the first device data segment by the additional device.

In yet another implementation, an additional device data segment may be provided to the first device, and an additional device data validity indication may be derived by the first device. The additional device data validity indication is associated with the additional device data segment, and the first device memory segment corresponding to the additional device is updated based upon the association. The additional device data segment may be provided periodically to the first device.

In another general aspect, memory sharing includes providing two or more participating devices. Each participating device has a memory and is configured to be connected to a network. A portion of the memory of each participating device is allocated, and the allocated portion of memory has two or more memory segments, each of which corresponds to a participating device. A data segment is provided from one participating device to all other participating devices. A data validity indication is derived for the data segment at each participating device. The data validity indication is associated with the data segment, and the memory segment corresponding to the provided data segment is updated.

In one implementation, each participating device is assigned a transmission sequence indicator, and data segments from the participating devices are sequentially provided by providing a data segment from one participating device to all other participating devices according to the transmission sequence indicator. The transmission sequence indicator may be based on the address of the memory segment corresponding to the participating device.

In another implementation, a designated timeslot is provided for each participating device to provide a data segment corresponding to that device. A transmission timeout counter is provided and initiated. The timeslot is monitored for provision of a data segment by the appropriate participating device, and the next device in sequence provides a data segment based upon the expiration of the transmission timeout counter and the failure of the appropriate participating device to provide a data segment.

Other features and advantages will be apparent from the description and drawings, and from the claims.

DESCRIPTION OF DRAWINGS

Like reference symbols in the various drawings indicate like elements.

DETAILED DESCRIPTION

Figure 1:
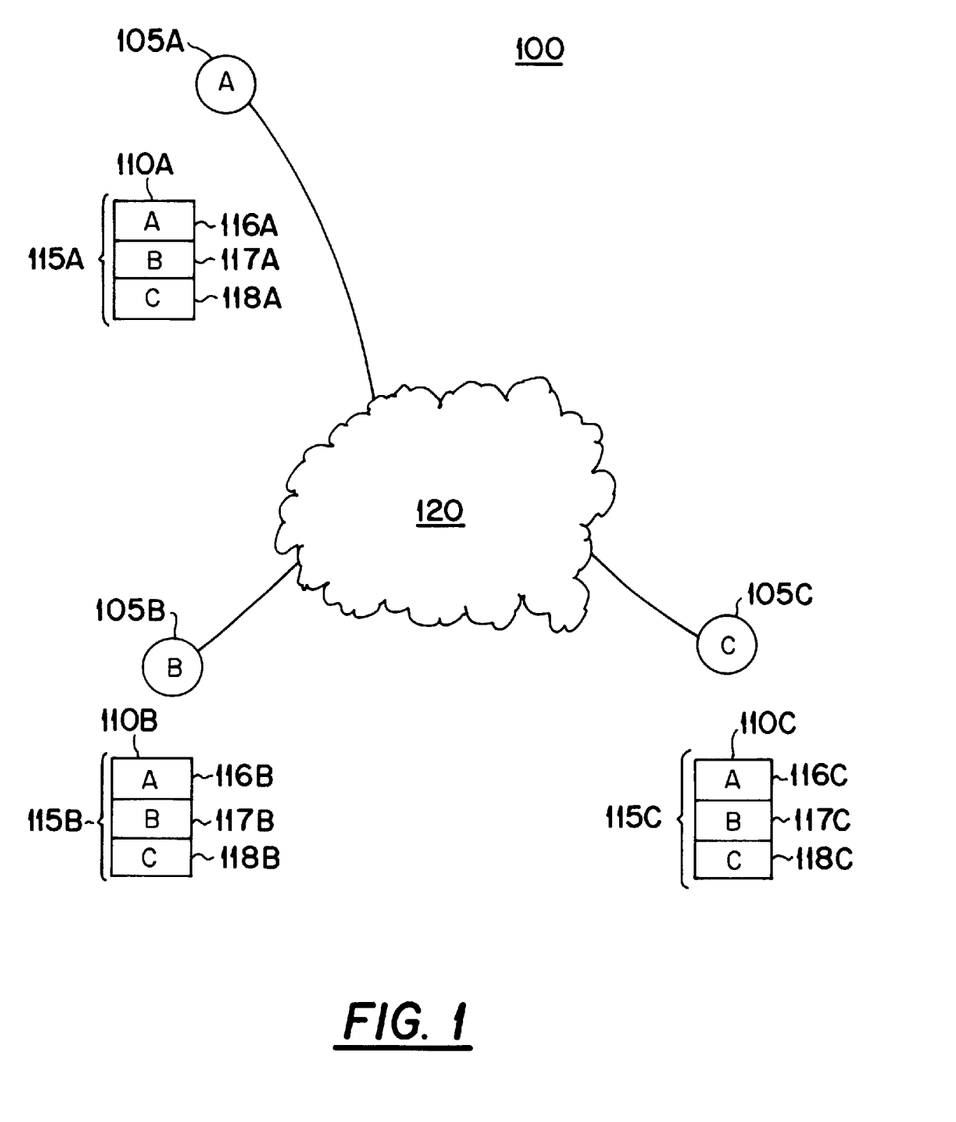
FIGS. 1–3 are block diagrams of a communications system.

As shown in FIG. 1, a communications system 100 includes multiple devices 105A, 105B, 105C connected to a communications network 120. The communications system 100 may be, for example, a peer-to-peer network. The devices 105A, 105B, 105C have associated memories 110A, 110B, 110C. A pre-defined number of devices may be used in the communications system 100. Although FIG. 1 shows a communications system using three devices, a different number of devices may be used. For example, two devices may be used, or more than two devices may be used. The devices 105A, 105B, 105C may include microprocessors or microcontrollers.

In one implementation, the communications system 100 has multiple autonomous devices that do not share a primary memory, but cooperate by sending messages over the communications network 120. The devices may be physically close to one another, physically dispersed, connected by a relatively fast and more reliable communications network, or connected by a relatively slow and less reliable communications network.

The communications network 120 may be any known or described network including, for example, analog or digital wired and wireless telephone networks (e.g., PSTN, ISDN, and XDSL), radio, fiber optic, the Internet, the World Wide Web, WANs, LANs, cable, satellite, and/or any other delivery mechanism for carrying data. The shared memory information may be shared using any communications protocol such as, for example, the Modbus protocol.

Portions 115A, 115B, 115C of the memories 110A, 110B, 110C of the devices 105A, 105B, 105C are allocated for the purpose of memory sharing. The allocated portions 115A, 115B, 115C are called the shared memory pool. The allocated portions of memory may be of any size. The size of the allocated portion of memory may be predetermined for each device, and may differ from device to device. The allocated portion of memory for a device, also called the memory pool or memory block, is sub-divided into one or more memory segments, with each of the memory segments corresponding to one of the networked devices participating in the memory sharing activity. For example, the allocated portion 115A of memory for device 105A is divided into three memory segments 116A, 117A, 118A. Memory segment 116A corresponds to device 105A, memory segment 117A corresponds to device 105B, and memory segment 118A corresponds to device 105C. Similarly, the allocated portions 115B, 115C of the memories 110B, 110C for devices 105B, 105C are also divided into three memory segments 116B, 117B, 118B, and 116C, 117C, 118C, respectively. Memory segments 116B, 116C correspond to device 105A, memory segments 117B, 117C correspond to device 105B, and memory segments 118B, 118C correspond to device 105C.

In one implementation of the communications system 100 of FIG. 1, the devices 105A, 105B, 105C are each allocated the same amount of memory. The shared memory pools 115A, 115B, 115C are further subdivided into a number of smaller memory segments, with each memory segment corresponding to and updated by a different device. Each segment is updated by its corresponding device, but the data is visible to and may be read and used by the other devices to which the data segment was provided. In particular, the memory pool 115A for device 105A is divided into three memory segments 116A, 117A, 118A. Memory segment 116A corresponds to and is updated by device 105A, memory segment 117A corresponds to and is updated by device 105B, and memory segment 118A corresponds to and is updated by device 105C. Similarly, the memory pools 115B, 115C for devices 105B, 105C are divided into memory segments 116B, 117B, 118B, and 116C, 117C, 118C, respectively. Memory segments 116B, 116C correspond to and are updated by device 105A, memory segments 117B, 117C correspond to and are updated by device 105B, and memory segments 118B, 118C correspond to and are updated by device 105C.

In one implementation, communications system 120 may use the Modbus communication protocol using serial communications over physical data links. The communications system 120 may be, for example, an RS-422, RS-485, or RS-232 serial data communication link. In other implementations, the communications system 120 may be, for example, a universal serial bus (USB) or a parallel data communication link.

Figure 2:
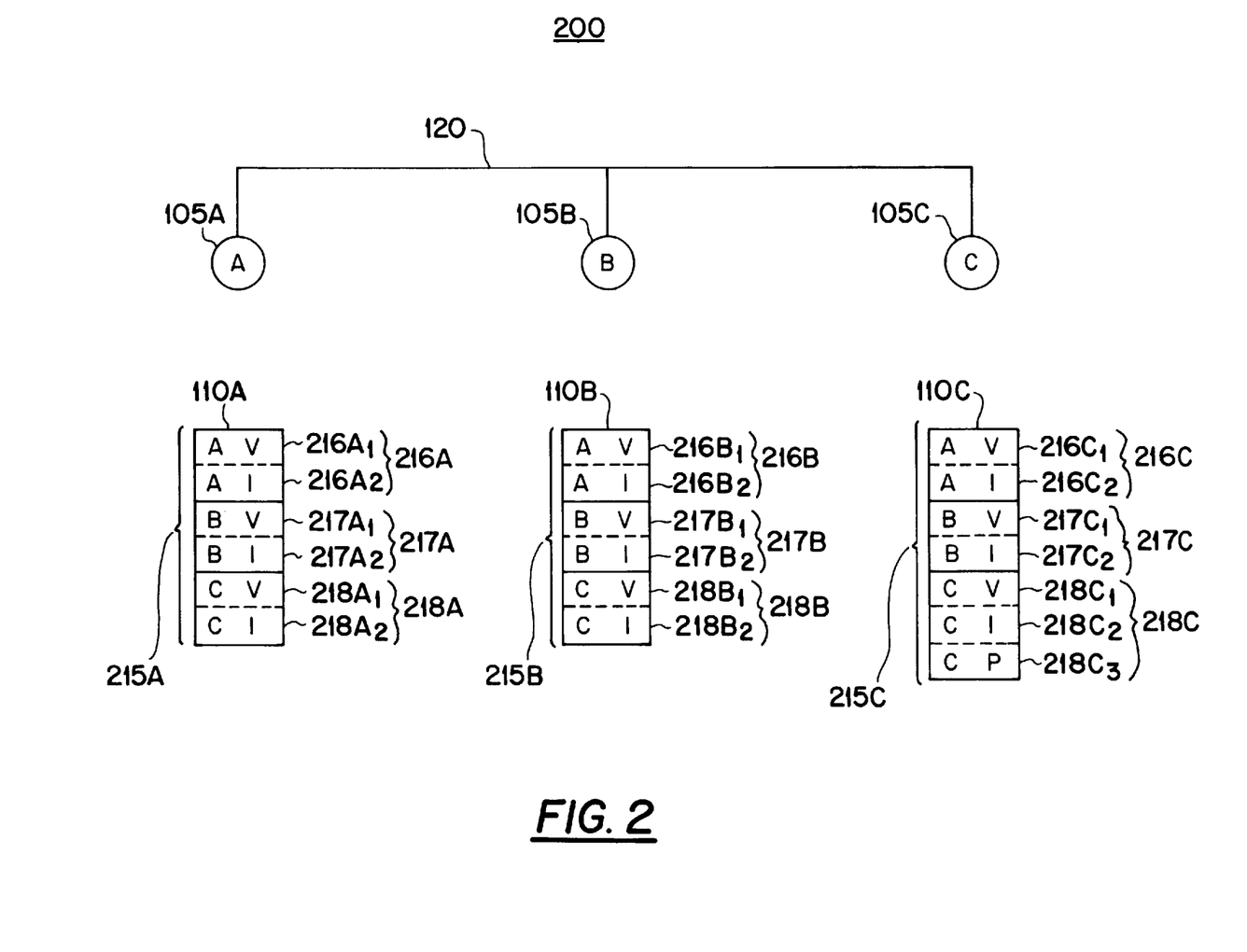

As shown in FIG. 2, a communications system 200 illustrates an implementation of the communications system 100 of FIG. 1, and includes multiple devices 105A, 105B, 105C connected to a communications network 120. Each of the devices 105A, 105B, 105C has a memory 110A, 110B, 110C.

As show in the implementation of FIG. 2, two devices 105A, 105B have each been allocated the same amount of memory 215A, 215B, and one device 105C has been allocated a different amount of memory 215C. In the example of FIG. 2, devices 105A 105B 105C may be used in the control, supervision, and protection of a power system or in the control and supervision of an industrial process. For example, devices 105A, 105B may correspond to protective relays in a power system that measure voltage and current, and device 105C may correspond to a protective relay that measures voltage, current and power. In another implementation, devices 105A, 105B may correspond to monitoring and control nodes in an industrial process that monitor two process variables, and device 105C may correspond to a monitoring and control node that monitors three process variables. In these examples, devices 105A, 105B require less information and consequently less memory than device 105C.

The shared memory pools 215A, 215B, 215C have each been further subdivided into a number of smaller memory segments, with each memory segment corresponding to and updated by a different device. Each segment is updated by its corresponding device, but the data is visible to and may be read and used by the other devices to which the data segment was provided.

In particular, the memory pools 215A, 215B for devices 105A, 105B are divided into memory segments 216A, 217A, 218A, and 216B, 217B, 218B, respectively. Memory segments 216A, 216B correspond to and are updated by device 105A, memory segments 217A, 217B correspond to and are updated by device 105B, and memory segments 218A, 218B correspond to and are updated by device 105C.

Memory segments 216A, 216B are each divided into two further segments 216A1, 216A2 and 216B1, 216B2. These segments may correspond to, for example, the voltage and current monitored by a protective relay at device 105A or two process variables monitored by device 105A. Memory segments 217A, 217B are each divided into two further segments 217A1, 217A2 and 217B1, 217B2. These segments may correspond to, for example, the voltage and current monitored by a protective relay at device 105B or two process variables monitored by device 105B. Likewise, memory segments 218A, 218B are each divided into two further segments 218A1, 218A2 and 218B1, 218B2. These segments may correspond to, for example, the voltage and current monitored by a protective relay at device 105C or two process variables monitored by device 105C.

The memory pool 215C for device 105C is divided into memory segments 216C, 217C, 218C, which are not of equal size. Memory segment 216C corresponds to and is updated by device 105A, memory segment 217C corresponds to and is updated by device 105B, and memory segment 218C corresponds to and is updated by device 105C.

Memory segments 216C and 217C are each subdivided into two further segments, 216C1, 216C2 and 217C1, 217C2. These segments may correspond to, for example, the voltage and current monitored by a protective relays at devices 105A, 105B or two process variables monitored by devices 105A, 105B. However, unlike memory pools 215A, 215B, in memory pool 215C the memory segment 218C is subdivided into three further segments, 218C1, 218C2, 218C3. These segments may correspond to, for example, the voltage, current, and power monitored by a protective relay at device 105C or three process variables monitored by device 105C.

Figure 3:
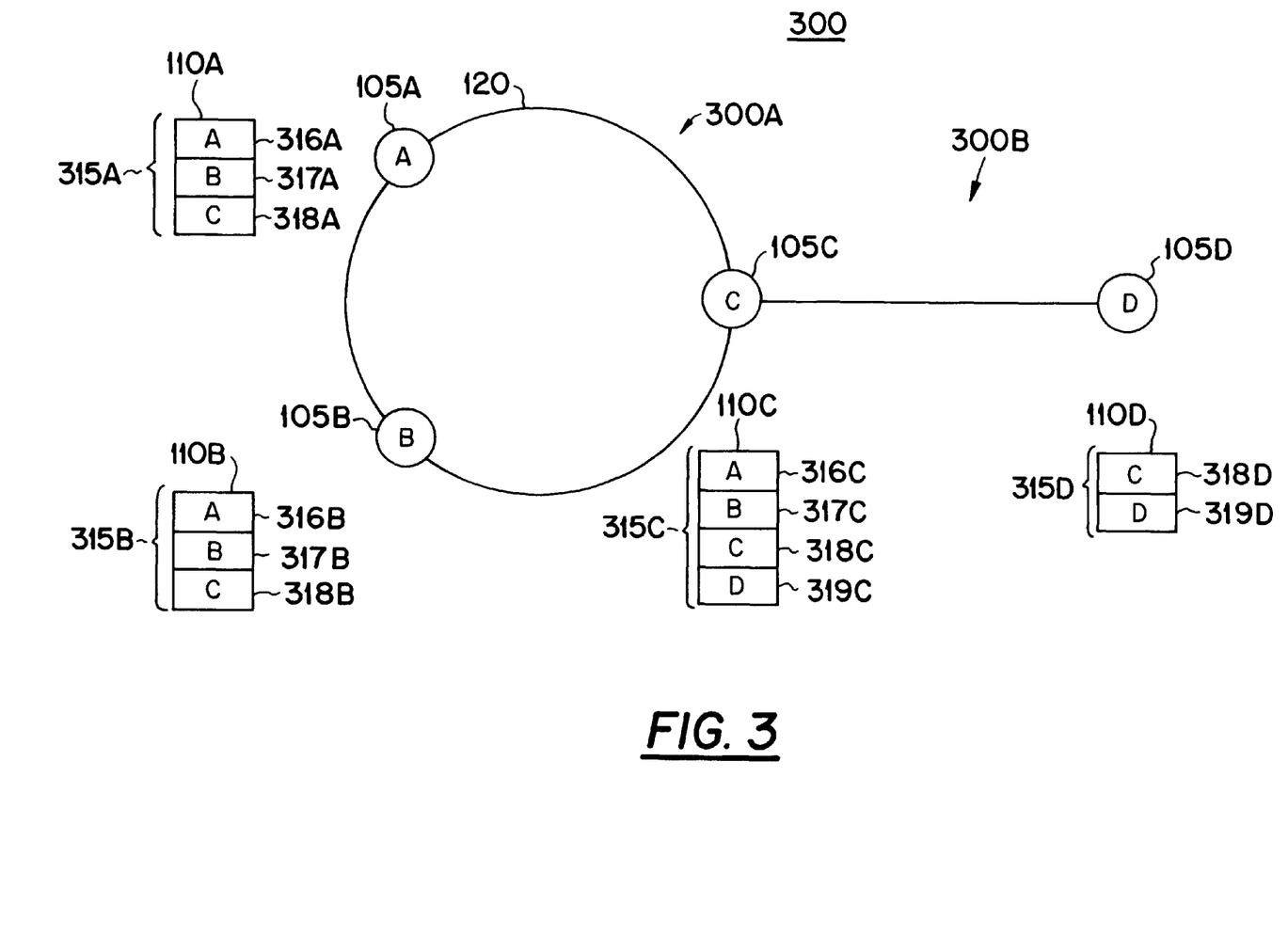

As shown in FIG. 3, a communications system 300 illustrates an implementation of the communications system 100 of FIG. 1, and includes multiple devices 105A, 105B, 105C, 105D connected to a communications network 120. Each of the devices 105A, 105B, 105C, 105D has a memory 110A, 110B, 110C, 110D.

As shown in the implementation of FIG. 3, three devices 105A, 105B, 105C form a first group 300A, and two devices 105C, 105D form a second group 300B. Device 105C is common to both groups 300A, 300B. In the first group 300A, two devices 105A, 105B have each been allocated the same amount of memory 315A, 315B, and one device 105C has been allocated a different amount of memory 315C. In the second group 300B, device 105C has been allocated a different amount of memory than device 105D. The amount of memory allocated to device 105D may be smaller than that allocated to devices 105A, 105B. In this example, devices 105A, 105B, 105D only belong to one group and therefore require less memory to be allocated than required by device 105C.

The shared memory pools 315A, 315B, 315C, 315D have each been further subdivided into a number of smaller memory segments, with each memory segment corresponding to and updated by a different device. Each segment is updated by its corresponding device, but the data is visible to and may be read and used by the other devices to which the data segment was provided.

In particular, in the first group 300A, the memory pools 315A, 315B for devices 105A, 105B are divided into three memory segments each 316A, 317A, 318A, and 316B, 317B, 318B. Memory segments 316A, 316B correspond to and are updated by device 105A, memory segments 317A, 317B correspond to and are updated by device 105B, and memory segments 318A, 318B correspond to and are updated by device 105C. The memory pool 315C for device 105C is divided into memory segments 316C, 317C, 318C, 319C. Memory segment 316C corresponds to and is updated by device 105A, memory segment 317C corresponds to and is updated by device 105B, memory segment 318C corresponds to and is updated by device 105C. Memory segment 319C corresponds to and is updated by device 105D of the second group 300B.

In the second group 300B, memory pool 315C for device 105C is divided into memory segments 316C, 317C, 318C, 319C. Memory segment 318C corresponds to and is updated by device 105C, and memory segment 319C corresponds to and is updated by device 105D. The memory pool 315D for device 105D is divided into memory segments 318D, and 319D. Memory segment 318D corresponds to and is updated by device 105C, and memory segment 319D corresponds to and is updated by device 105D.

Figure 4:
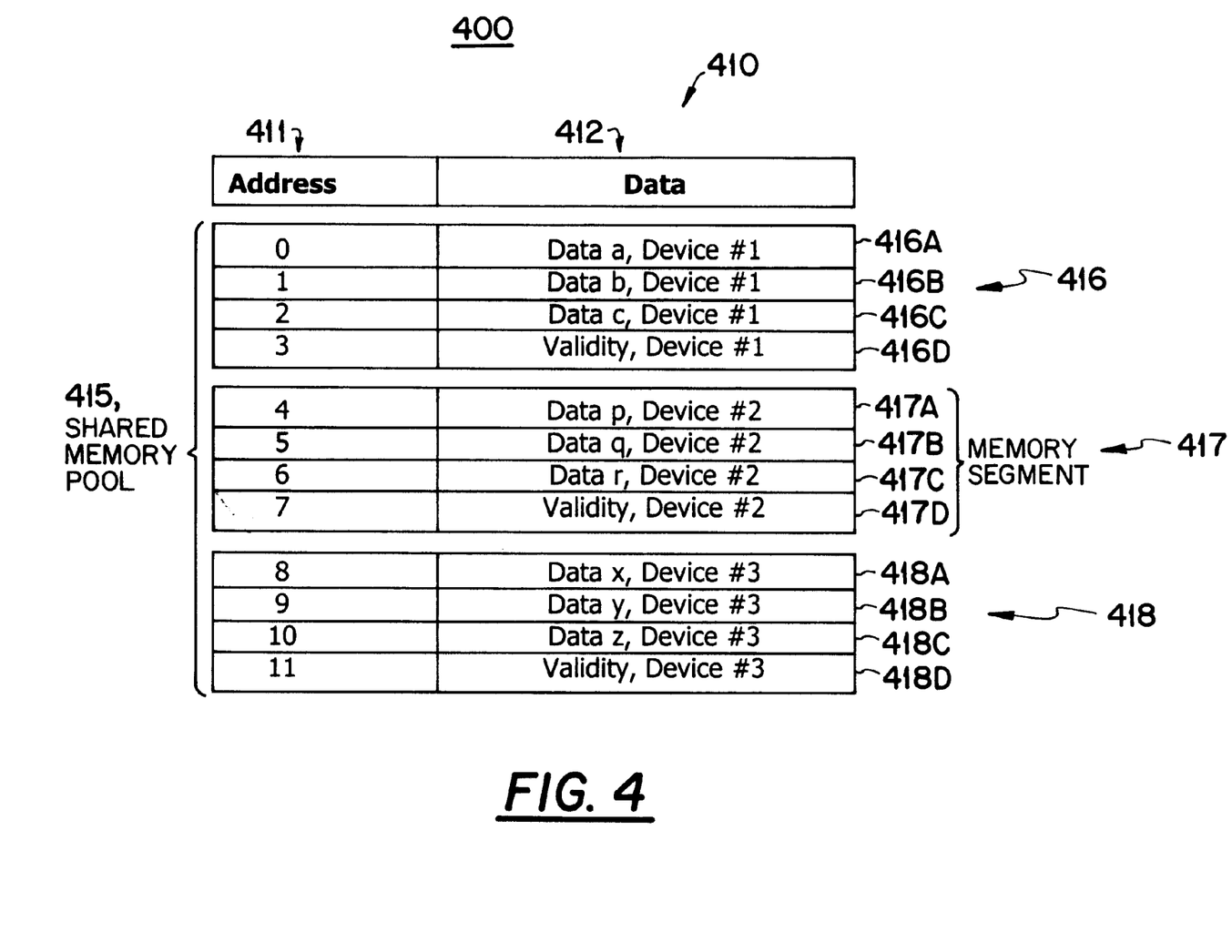
FIG. 4 is a diagram of a shared memory pool that may be implemented in the systems of FIGS. 1–3.

As shown in FIG. 4, a device 400 has a memory 410 with a section of memory space allocated to a shared memory pool 415. The shared memory pool 415 is divided into memory segments. In one implementation, the shared memory pool 415 is divided into three segments 416, 417, 418, with each segment corresponding to a different networked device where there are three devices in the network—Device #1, Device #2, and Device #3. The shared memory pool 415 may be allocated identically in all three devices. In other implementations, the shared memory pool 415 may be divided into fewer segments if the memory is not to be shared with all networked devices for a three device network or may be divided into more segments if there are more than three devices in the network. Also, fewer than three devices or more than three devices may be networked.

FIG. 4 shows a sample address 411 and sample data for the shared memory pool 415. In segment 416, memory addresses 0 through 3 (416A 416B 416C 416D) correspond to Device #1. Memory addresses 0 through 2 (416A 416B 416C) are used for data, and memory address 3 (416D) is used for a data validity indication. Device #1 is authorized to write to memory addresses 0 through 2 (416A 416B 416C) in the shared memory pools of all three devices, and all three devices are authorized to read from memory addresses 0 through 2 (416A 416B 416C). For example, Device #1 may broadcast a data segment containing Data a (416A), Data b (416B), and Data c (416C) to Device #2 and Device #3. Thus, assuming error free transmission and reception, the data segment (containing Data a, b, c) is stored in memory segment 416 of all three devices, and is therefore visible to all devices.

The data validity indication, in this example memory address (416D), is updated by the individual device based on the validity of the data received over the network. Thus, for example, the data validity indication for data received from Device #1 is updated by Device #1 in the memory pool of device #1, updated by Device #2 in the memory pool of Device #2, and updated by Device #3 in the memory pool of Device #3.

In segment 417, memory addresses 4 through 7 (417A 417B 417C 417D) correspond to Device #2. Memory addresses 4 through 6 (417A 417B 417C) are used for data, and memory address 7 (417D) is used for a data validity indication. Device #2 is authorized to write to memory addresses 4 through 6 (417A 417B 417C) in the shared memory pools of all three devices, and all three devices are authorized to read from memory addresses 4 through 6 (417A 417B 417C). For example, Device #2 may broadcast a data segment containing Data p (417A), Data q (417B), and Data r (417C) to Device #1 and Device #3. Thus, assuming error free transmission and reception, the data segment (containing Data p, q, r) is stored in memory segment 417 of all three devices, and is therefore visible to all devices.

The data validity indication, in this example memory address (417D), is updated by the individual device based on the validity of the data received over the network. Thus, for example, the data validity indication for data received from Device #2 is updated by Device #1 in the memory pool of device #1, updated by Device #2 in the memory pool of Device #2, and updated by Device #3 in the memory pool of Device #3.

Similarly, in segment 418, memory addresses 8 through 11 (418A 418B 418C 418D) correspond to Device #3. Memory addresses 8 through 10 (418A 418B 418C) are used for data, and memory address 11 (418D) is used for a data validity indication. Device #3 is authorized to write to memory addresses 8 through 10 (418A 418B 418C) in the shared memory pools of all three devices, and all three devices are authorized to read from memory addresses 8 through 10 (418A 418B 418C). For example, Device #3 may broadcast a data segment containing Data x (418A), Data y (418B), and Data z (418C) to Device #1 and Device #2. Thus, assuming error free transmission and reception, the data segment (containing Data x, y, z) is stored in memory segment 418 of all three devices, and is therefore visible to all devices.

The data validity indication, in this example memory address (418D), is updated by the individual device based on the validity of the data received over the network. Thus, for example, the data validity indication for data received from Device #3 is updated by Device #1 in the memory pool of device #1, updated by Device #2 in the memory pool of Device #2, and updated by Device #3 in the memory pool of Device #3.

Each device will provide the other devices with the contents of its individual memory segment. In one implementation, each device may broadcast the contents of its individual memory segment to the other devices. Usually, provisions are made to, for example, send the address or other identifier of the memory segment being broadcast, detect and report communications errors, prevent network collisions such as, for example, when multiple devices attempt to transmit at the same time, and recover after a failure in the communications network or in an individual device.

Figure 5:
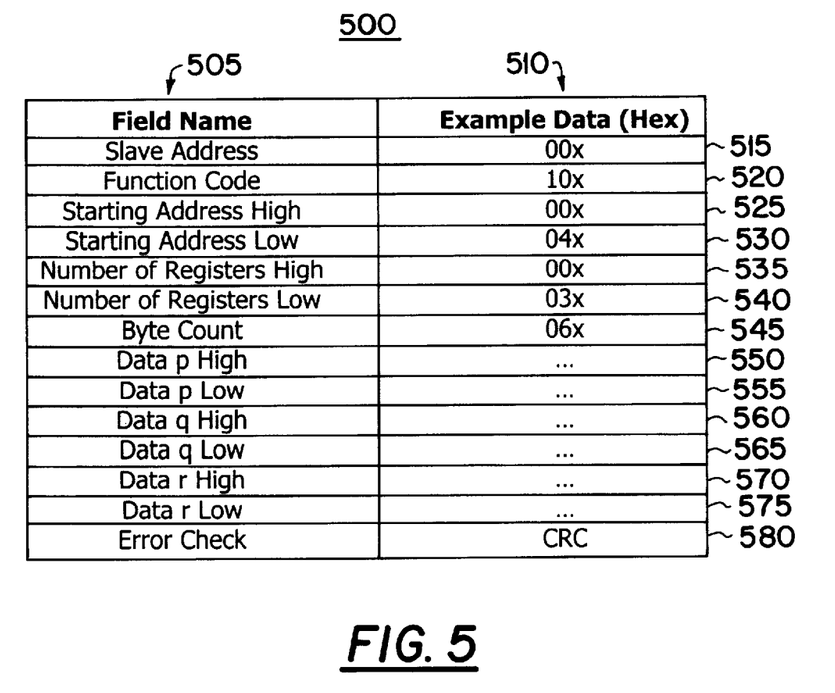
FIG. 5 is a diagram of a data exchange format that may be implemented in the systems of FIGS. 1–3.

FIG. 5 illustrates a sample data format for broadcasting data and sending the individual memory segment address using the Modbus communication protocol. The use of a standard communication protocol, such as, for example, the Modbus communication protocol, offers a standardized format for data exchange over a variety of physical data links using, for example, serial communications. Modbus devices may communicate using both master-slave and peer-to-peer communications techniques. Other data formats and communications protocols may also be used.

In the example of FIG. 5, data format 500 includes a series of field names 505 and data 510. Using the data format 500, data may be shared by broadcasting to other devices. In particular, in order to broadcast the data to all participating peer devices, the slave address 515 is set to zero in accordance with the Modbus protocol for broadcasting data. FIG. 5 shows the function code 520 for Modus command #16 (10 in Hexadecimal), "Preset Multiple Registers," which will allow the data to be written to multiple devices.

FIG. 5 shows the broadcast of data p, q, r (550–575) corresponding to data p, q, r (417A–417C) of Device #2 in the example of FIG. 4. The starting address of the data to be broadcast 525, 530, corresponds to memory address 4 (417A) in FIG. 4, and the number of registers to be broadcast (535, 540), i.e., three registers, corresponds to the three data registers (417A 417B 417C) of Device #2 in FIG. 4. The data format 500 also has an error check field 580. The error check field 580 may be, for example, a cyclic redundancy check (CRC) or other appropriate error checking mechanism such as, for example, a longitudinal redundancy check (LRC).

Figure 6:
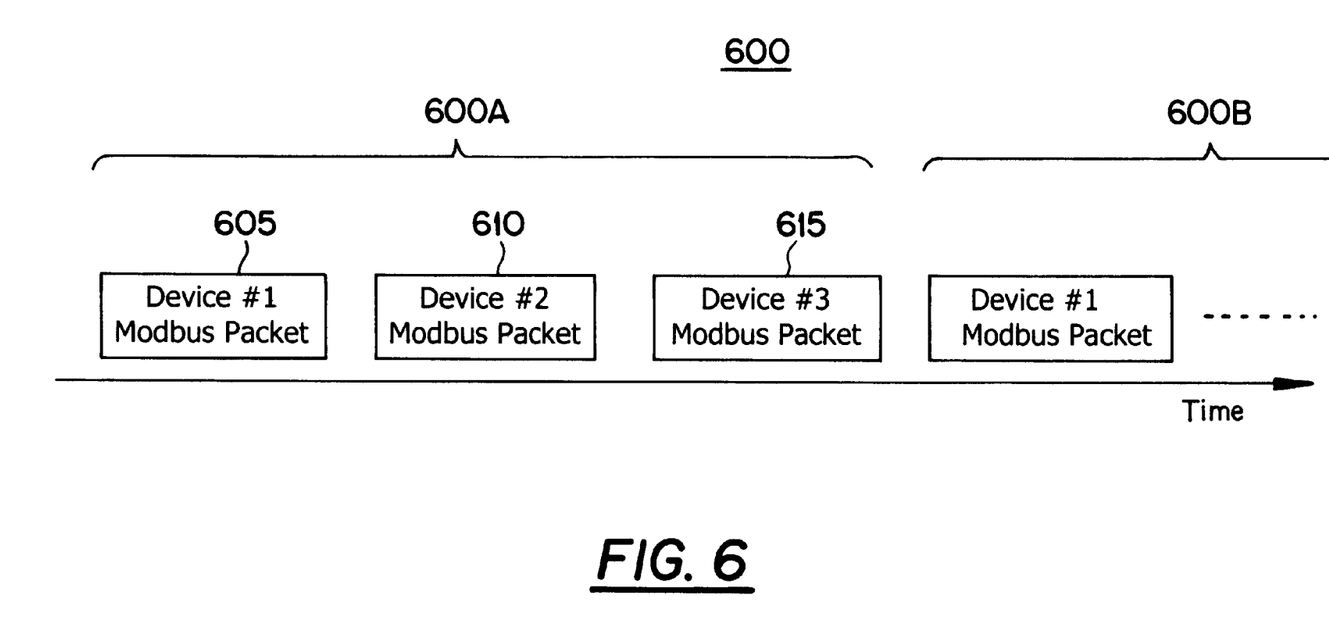
FIG. 6 is a block diagram of a data transmission sequence that may be implemented in the systems of FIGS. 1–3.

As shown in FIG. 6, an orderly exchange of information among multiple devices connected to a communications network may be used to prevent network collisions such as, for example, when two or more devices attempt to send data at the same time. In particular, as shown in FIG. 6, three devices may take turns transmitting data in a round-robin manner. The data may be transmitted continuously, alternating with one round of transmission 600A followed by another round of transmission 600B. Each round of transmission 600A, 600B includes an opportunity for each participating device to transmit data. A timeout function may be used to detect the absence of transmission from a device.

In the example of FIG. 6, three devices (Device #1, Device #2, Device #3) take turns broadcasting the contents of its designated memory block. The devices may transmit in a predefined sequence such as, for example, in ascending or descending order based upon the device's initial allocated memory address in the shared memory pool. As shown in FIG. 4, Device #1 has the lowest initial memory address 416A, Device #2 has the next lowest initial memory address 417A, and Device #3 has the highest initial memory address 418A. Therefore, in this example, if the device transmission order is in ascending order of the initial memory address, the data transmission order of one round of transmission 600A would be Device #1 transmitting a data packet (605) first, followed by a data packet from Device #2 (610), and ending with a data packet (615) transmitted by Device #3. After a first round of transmission 600A is complete, a second round of transmission 600B would then begin starting with Device #1. Once the second round of transmission 600B ended, another round of transmission would begin. The round-robin transmission 600 may continue as long as there are at least two devices on the network.

Other collision avoidance mechanisms may be used. For example, some communications networks may provide a collision avoidance mechanism such as Carrier Sense Multiple Access/Collision Detection (CSMA/CD) as a part of the network physical layer specification. When appropriate, a different collision avoidance mechanism may be used. For example, where the physical layer of the communications network is capable of detecting and arbitrating network access collisions, each device may attempt to transmit its data segment as soon as it becomes available. The transmitted data segment may include an expiration time field to operate a transmission timeout counter on the receiving devices.

Provisions may be made for recovery from a failure in the communication link between devices or a failure in an individual device. In one implementation, a timeout function may be used to detect if a given device has failed to transmit in its allocated time slot, and, if so, the next device in sequence may begin to transmit once the timeout period has expired. Each device knows its proper turn, and transmits in its designated time slot. If a device fails to use its time slot, the next device in sequence takes over. However, if a device misses its designated time slot, it only need wait for the completion of a single round robin cycle to begin transmitting again.

For example, in one implementation, all devices may communicate using the same communications speed, which is predetermined. Individual devices may calculate the amount of time necessary for transmission of a single memory segment by dividing the number of bits in the memory segment data packet by the communication speed. All of the participating devices may use a common, predefined, timeout interval. After receiving a valid message transmitted from a given device, all devices update their respective memory segments corresponding to the transmitting device. All devices then reset their timeout timer, which will be used to supervise data reception from the next device designated to transmit data. If the designated device fails to respond within the predefined timeout period, the next designated device is allowed to take control of the communications network and start transmitting its data. This sequence is repeated until all available devices are exhausted, and the next round robin cycle begins.

All participating devices may keep track of the round robin data transmission order. If a received message falls outside of the expected order, all missing memory segments (i.e., all memory segments between the last valid segment and the currently received segment) are tagged as invalid by, for example, deactivating an associated validity bit.

A device that previously failed to transmit may rejoin the data exchange in its next regularly scheduled time interval. For example, if a device had previously been inactive, it may rejoin the data exchange by monitoring the activity on the data link for at least N−1 timeout periods before attempting to transmit its data, where N is the total number of devices participating in the data exchange, This arbitration of network access rights helps to reduce collision problems, and also allows for automatic recovery from a communications link failure or individual device failure.

The timeout interval typically may be set between approximately ⅓ and approximately ⅔ of the data packet length. For example, if the Modbus protocol is used, the timeout interval is typically longer than the Modbus prescribed Remote Terminal Unit (RTU) mode 3.5 character minimum inter-message gap, and shorter than the amount of time necessary to successfully transmit a single Modbus packet. If a device fails to transmit in its allocated timeslot, the next designated device begins to transmit after the timeout timer expires. Effectively, the data exchange rate speeds up because the next designated device begins to transmit earlier than it otherwise would have.

Also, in another implementation, where the physical layer of the communications network is capable of detecting and arbitrating network access collisions, the transmitted data segment may include an expiration time field to operate a transmission timeout counter on the receiving devices.

Referring again to FIG. 4, memory segments 416, 417, 418 each have a location 416D, 417D, 418D reserved for indicating the validity of the segment contents. The validity indication is provided and is associated with the data segment in order to enable the detection of communication problems such as, for example, data transmission errors, including data corruption, that may occur. Although shown as a memory location 416D, 417D, 418D, the message validity may be indicated with a single bit. The validity indication may also be stored outside of the main shared memory pool structure 415. Each data segment, correspond to data from each device, is associated with a validity indication.

For example, a memory segment may be tagged as invalid if the message from a given device is missing from its scheduled sequence or the starting address is incorrect, such as when the starting address is not the expected address boundary. A memory segment may also be tagged invalid if, for example, the number of registers does not match the segment size, the byte count is incorrect, the error check byte (e.g., CRC) does not match, a communication error is detected, a physical link error is detected, or a collision is detected.

The validity indication is continuously updated, typically with the transmission of the corresponding data segment, thus providing a real time indication of the reliability of the data stored in the shared memory of each device. For example, if only one device experienced data corruption receiving a given data segment, only that device would flag the received data segment as invalid while all other participating devices would flag the received data segment as valid. The error detection mechanism helps to enable decisions to be made by each device using the best data available to that device at the time of the decision, disregarding invalid data in the decision making process.

For example, the continuously updated validity indication helps the devices make reliable decisions in the presence of an unreliable communication network used for data sharing. The individual validity indicators at each device help take into account that some devices may not receive some of the broadcast messages from other devices, thus making portions of their shared memory pool invalid for a short period of time, for example, until the arrival of the next valid message. Even though some of the individual memory segments may be corrupted and therefore labeled invalid, the use of a continuously updated validity indicator allows the individual devices to make the best real-time decisions possible given the partial data set available to the device at a given point in time.

If a device becomes disconnected or unavailable due to, for example, a localized hardware failure, all communicating subsets of the network continue to function with the best available data and will reconnect into a common shared memory pool when the failed devices are restored to operation. Thus, the association of a continuously updated validity indicator with each individual memory segment helps the distributed decision making process.

Figure 7:
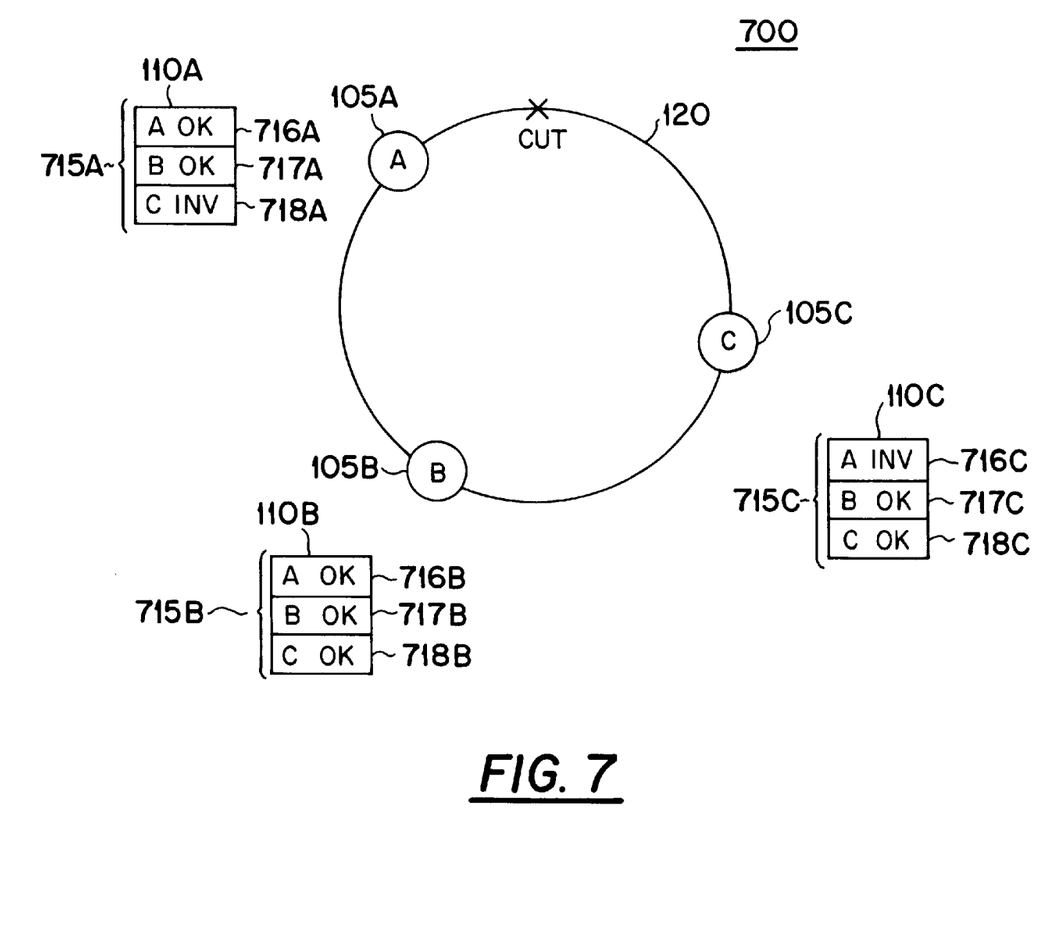
FIG. 7 is a block diagram of a communications system with a fault condition in a communications path.

As shown in FIG. 7, a communications system 700 illustrates an implementation of the communications system 100 of FIG. 1. As shown in FIG. 7, three devices 105A, 105B, 105C have each been allocated the same amount of memory.

In the example of FIG. 7, the communications path between device 105A and device 105C has experienced a failure such that device 105A no longer receives data from device 105C, and device 105C no longer receives data from device 105A. In such a case, the validity indicators in the memory pools 715A, 715C will be updated to reflect the communication path failure. In particular, in memory pool 715A, the data segment 718A associated with device 105C is tagged invalid as long as no further communications are received from device 105C. Likewise, for device 105C, the data segment 716C associated with device 105A is tagged as invalid as long as no further communications are received from device 105A. However, device 105B continues to receive data from both device 105A and device 105C, and therefore the data validity indicators for memory pool 715B show all data segments as being valid. If communications are restored between devices 105A and 105C, the data validity indicators for the respective memory segments will be updated to reflect the data as being valid rather than invalid.

Figure 8:
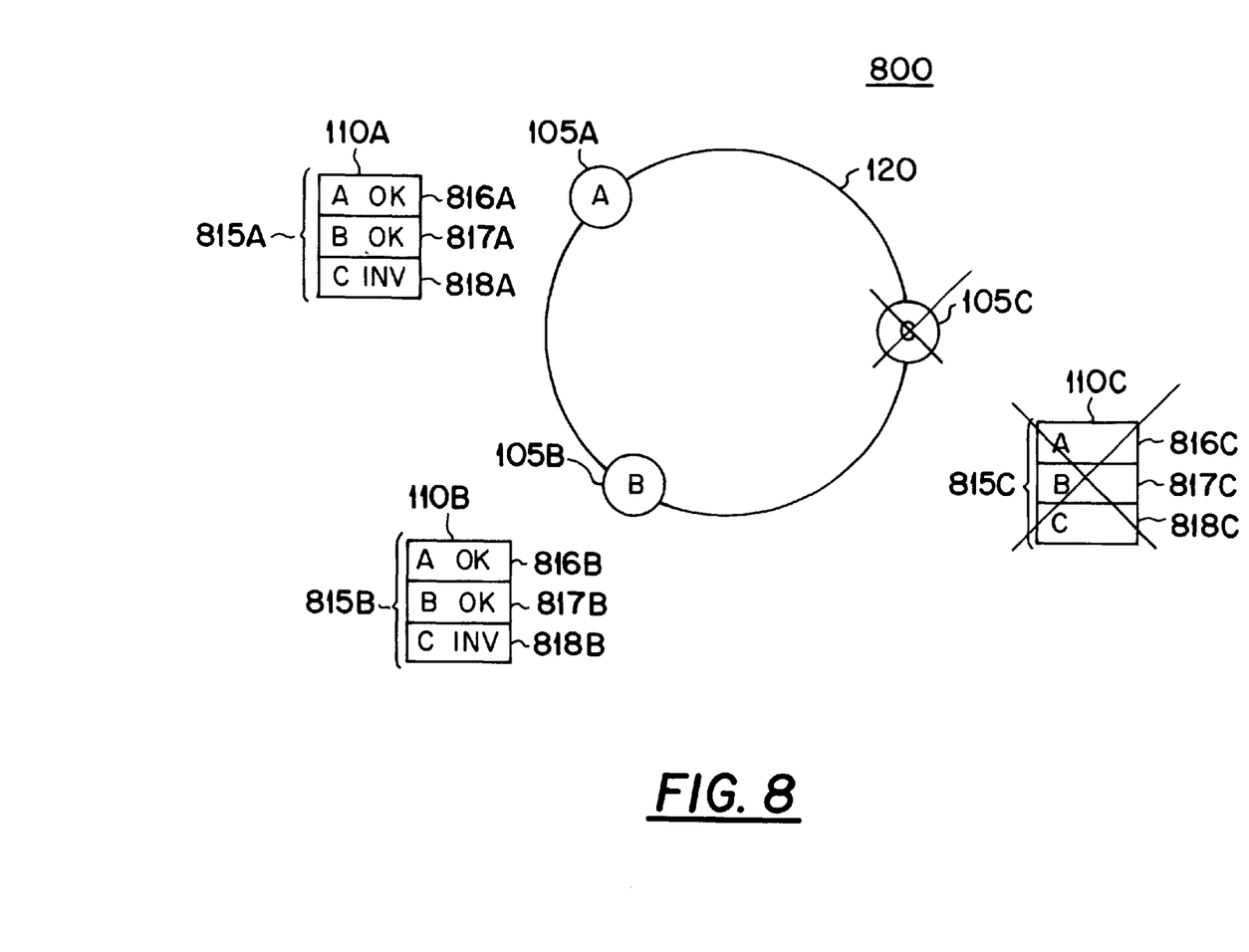
FIG. 8 is a block diagram of a communications system with a fault condition in a device.

As shown in FIG. 8, a communications system 800 illustrates an implementation of the communication system 100 of FIG. 1. As shown in FIG. 8, devices 105A, 105B, 105C have each been allocated the same amount of memory.

In the example of FIG. 8, device 105C has experienced a failure such that device 105C no longer transmits data to devices 105A, 105B and no longer receives data from devices 105A, 105B. In such a case, the validity indicators in the memory pools 815A, 815B will be updated to reflect the device 105C failure. In particular, in memory pool 815A, the data segment 818A associated with device 105C is tagged invalid as long as no further communications are received from device 105C. Likewise, for device 105B, the data segment 818B associated with device 105C is tagged invalid as long as no further communications are received from device 105C. If device 105C recovers from the failure and communications are restored with devices 105A and 105B, the data validity indicators for the respective memory segments will be updated to reflect the data from device 105C as being valid rather than invalid.

Figure 9:
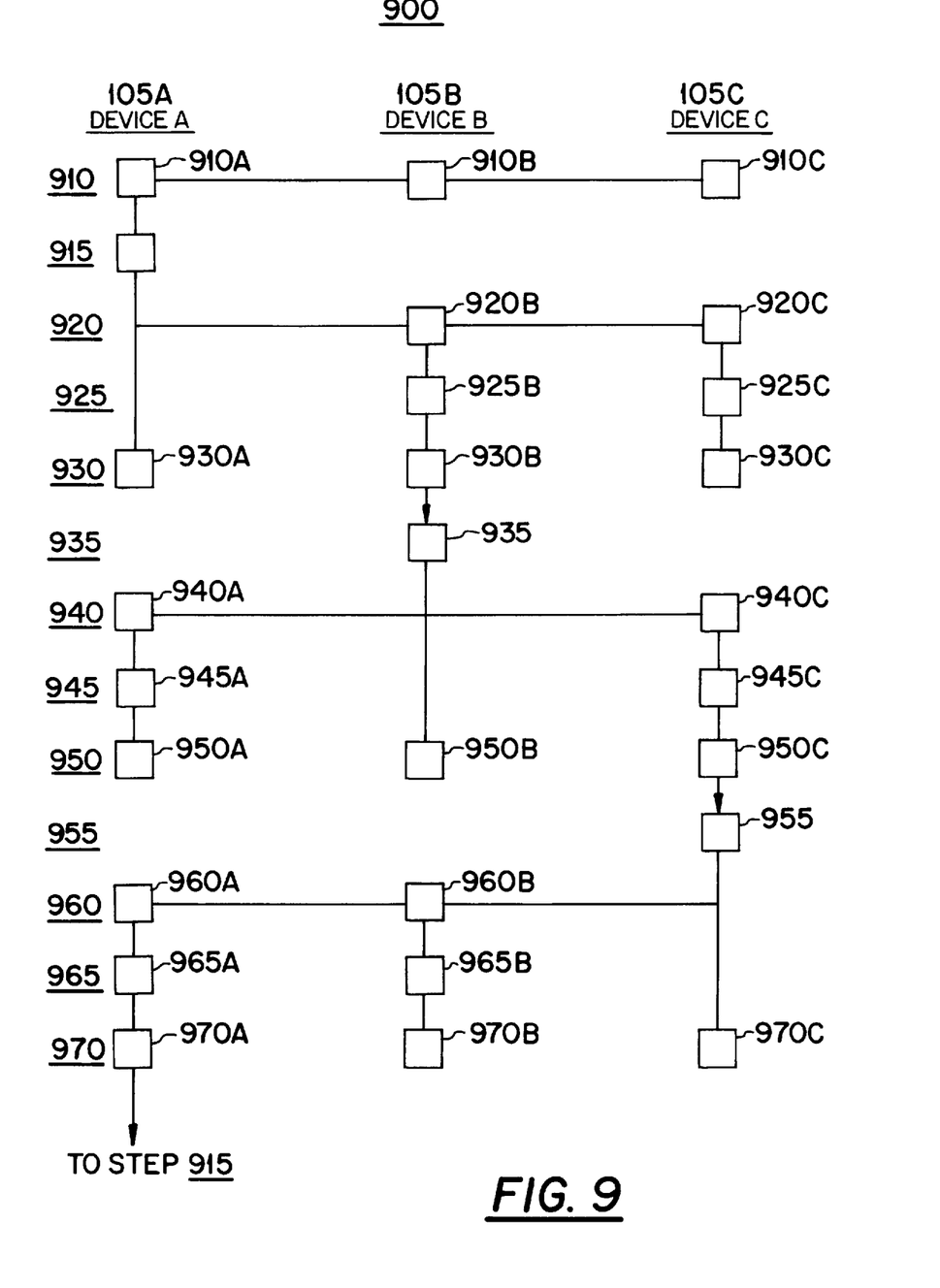
FIG. 9 is a flow chart of a process that may be implemented by the system of FIGS. 1–3.

As shown in FIG. 9, devices 105A, 105B, 105C interact according to a procedure 900 for sharing memory among devices connected to a communications network. The procedure 900 may be implemented by any type of hardware, software, device, microprocessor, microcontroller, computer, computer system, equipment, component, program, application, code, storage medium, or propagated signal. Although not shown in FIG. 9, devices 105A, 105B, 105C may be directly or indirectly connected through known or described delivery networks, examples of which are described with respect to communications network 120.

First, a memory pool is allocated for the memory sharing (step 910). As described above and as indicated by steps 910A, 910B, 910C, each device 105A, 105B, 105C may allocate a different amount of memory, or the same amount of memory may be allocated for each device.

Device 105A then provides a data segment (step 915). As described above, the devices may provide data in a predetermined round-robin order so that network collisions are avoided. The data segment may be provided as a broadcast message by device 105A to all other participating devices 105B, 105C. The broadcast message may be, for example, in Modbus format.

Devices 105B, 105C receive the data segment from device 105A (step 920). A validity indicator is independently derived at device 105B (step 920B) and at device 105C (step 920C).

Next, the data segment received from device 105A is independently associated with the validity indicator (step 925) at device 105B (step 925B) and at device 105C (step 925C).

The data segment at each device may be, for example, flagged as valid or invalid as a result of the association.

The data segment received from device 105A then is independently updated (step 930) in the memory pool of device 105A (step 930A), in the memory pool of device 105B (step 930B), and in the memory pool of device 105C (step 930C).

Device 105B then provides a data segment (step 935). As described above, the devices may provide data in a predetermined round-robin order so that network collisions are avoided. The data segment may be provided as a broadcast message by device 105B to all other participating devices 105A, 105C. The broadcast message may be, for example, in Modbus format.

Devices 105A, 105C receive the data segment from device 105B (step 940). A validity indicator is independently derived at device 105A (step 940A) and at device 105C (step 940C).

The data segment received from device 105B is independently associated with the validity indicator (step 945) at device 105A (step 945A) and at device 105C (step 945C). The data segment at each device may be, for example, flagged as valid or invalid as a result of the association.

The data segment received from device 105B then is independently updated in the memory pool (step 950) of device 105A (step 950A), in the memory pool of device 105B (step 950B), and in the memory pool of device 105C (step 950C).

Device 105C then provides a data segment (step 955). As described above, the devices may provide data in a predetermined round-robin order so that network collisions are avoided. The data segment may be provided as a broadcast message by device 105C to all other participating devices 105A, 105B. The broadcast message may be, for example, in Modbus format.

Devices 105A, 105B receive the data segment from device 105C (step 960). A validity indicator is independently derived at device 105A (step 960A) and at device 105B (step 960B).

The data segment received from device 105C then is independently associated with the validity indicator (step 965) at device 105A (step 965A) and at device 105B (step 965B).

The data segment at each device may be, for example, flagged as valid or invalid as a result of the association.

Next, the data segment received from device 105C is independently updated (step 970) in the memory pool of device 105A (step 970A), in the memory pool of device 105B (step 970B), and in the memory pool of device 105C (step 970C).

Another round of transmission may begin as described above with respect to step 915.

A number of implementations have been described. Nevertheless, various modifications may be made. Accordingly, other implementations are within the scope of the following claims.

What is claimed is:

1. A method of sharing memory comprising:
providing a first device and one or more additional devices, each device comprising a memory and each device configured to be connected to a network;
allocating a portion of the first device memory, the first device allocated memory portion comprising two or more first device memory segments, each first device memory segment corresponding to a device, at least one first device memory segment corresponding to an additional device;

allocating a portion of the additional device memory, the additional device allocated memory portion comprising two or more additional device memory segments, each additional device memory segment corresponding to a device, at least one additional device memory segment corresponding to the first device;

providing a first device data segment to the additional device;

deriving a first device data validity indication at the additional device;

associating the first device data validity indication with the first device data segment; and updating the additional device memory segment corresponding to the first device based on the association of the first device data validity indication with the first device data segment.

2. The method of claim 1 further comprising making a decision by the additional device based at least in part upon the updated additional device memory segment corresponding to the first device.

3. The method of claim 2 in which the decision is used at least in part to supervise, control, or protect a power system.

4. The method of claim 2 in which the decision is used at least in part to supervise and control an industrial process.

5. The method of claim 1 in which the first device data segment is provided periodically to the additional device.

6. The method of claim 1 in which a size of each device allocated memory portion is equal to the size of every other device allocated memory portion.

7. The method of claim 1 in which a size of one device allocated memory portion is different than a size of another device allocated memory portion.

8. The method of claim 1 in which a size of each device memory segment is equal to the size of every other memory segment.

9. The method of claim 1 in which a size of one device memory segment is different than a size of another memory segment.

10. The method of claim 1 in which the network comprises a serial data link and in which each device is physically dispersed from every other device.

11. The method of claim 1 in which the first device data segment is provided using the Modbus protocol.

12. The method of claim 1 further comprising providing by the first device of an error checking mechanism to the additional device.

13. The method of claim 1 in which the first device data validity indication is derived by the additional device based upon reception of the first device data segment by the additional device.

14. The method of claim 1 further comprising:

providing an additional device data segment to the first device;

deriving an additional device data validity indication by the first device;

associating the additional device data validity indication with the additional device data segment; and updating the first device memory segment corresponding to the additional device based on the association of the additional device data validity indication with the additional device data segment.

15. The method of claim 14 in which the additional device data segment is provided periodically to the first device.

16. A method of sharing memory comprising:

providing two or more participating devices, each participating device comprising a memory and each participating device configured to be connected to a network;

allocating a portion of the memory of each participating device, each allocated memory portion comprising two or more memory segments, with each memory segment corresponding to one participating device;

providing a data segment from one participating device to all other participating devices;

deriving a data validity indication for the data segment at each participating device;

associating the data validity indication with the data segment; and updating the memory segment corresponding to the provided data segment.

17. The method of claim 16 further comprising:

assigning each participating device a transmission sequence indicator; and in which providing a data segment comprises sequentially providing a data segment from one participating device to all other participating devices according to the transmission sequence indicator.

18. The method of claim 17 in which the transmission sequence indicator of a participating device is based on an address of the memory segment corresponding to the participating device.

19. The method of claim 17 further comprising:

providing a designated timeslot for each participating device to provide a data segment corresponding to that device;

providing a transmission timeout counter;

initiating the transmission timeout counter;

monitoring the timeslot for the provision of a data segment by the appropriate participating device; and providing a data segment by the next device in sequence based on the expiration of the transmission timeout counter and failure of the appropriate participating device to provide a data segment.

20. A system for sharing memory comprising:

a first device configured to be connected to a network, the first device comprising a memory, the first device memory comprising two or more first device memory segments, at least one first device memory segment corresponding to an additional device;

an additional device configured to be connected to a network, the additional device comprising a memory, the additional device memory comprising two or more additional device memory segments, at least one additional device memory segment corresponding to the first device;

in which the first device is configured to provide a first device data segment to the additional device; and in which the additional device is configured to derive a first device validity indication and to update the additional device memory segment corresponding to the first device with the first device data segment based upon the first device validity indication.

* * * * *